UNITED STATES PATENT OFFICE.

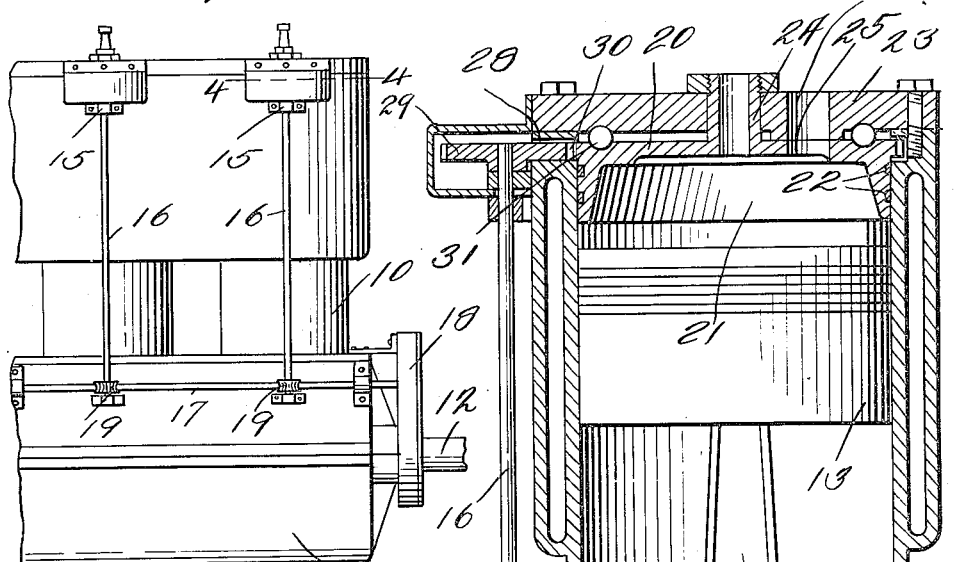
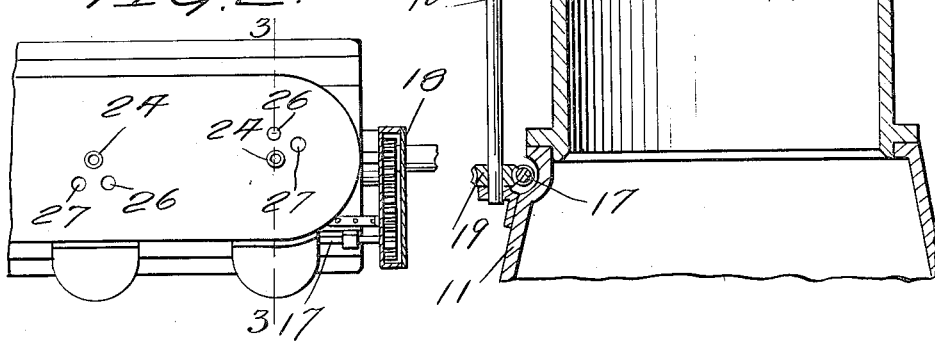
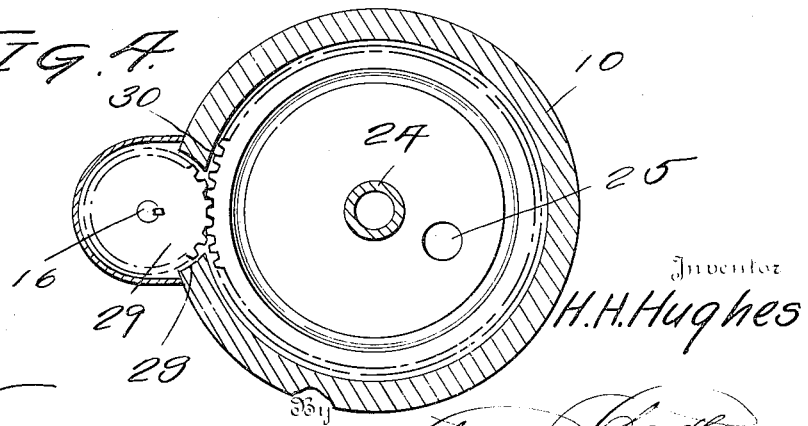

HOWARD H. HUGHES, OF MADRID, IOWA.

INTAKE AND EXHAUST VALVE FOR GAS-ENGINES.

1,212,488.  Specification of Letters Patent.  Patented Jan. 16, 1917.

Application filed April 4, 1916. Serial No. 88,962.

*To all whom it may concern:*

Be it known that I, HOWARD H. HUGHES, a citizen of the United States, residing at Madrid, in the county of Boone, State of Iowa, have invented certain new and useful Improvements in Intake and Exhaust Valves for Gas-Engines; and I do hereby declare the following to be a full, clear, and exact description of the invention, such as will enable others skilled in the art to which it appertains to make and use the same.

This invention relates to improvements in gas engines, and particularly to intake and exhaust valves therefor.

One object of the invention is to provide a single valve which will serve the purpose of admitting charges of gas to the cylinder and also to control the discharge of the exhaust or burnt gases.

Another object is to provide a valve of this character which is simple in construction, effective in operation, and which will automatically compensate for wear.

Another object is to provide a valve of this character which is so constructed and arranged that the gases can not get between the valve and the cylinder.

Other objects and advantages will be apparent from the following description when taken in connection with the accompanying drawing.

In the drawing: Figure 1 is an elevation of a portion of an engine equipped with my improved valve; Fig. 2 is a top plan view; Fig. 3 is a vertical median transverse section through one of the cylinders. Fig. 4 is a horizontal section taken through one of the cylinder heads and showing the gears used herewith.

Referring particularly to the accompanying drawing, 10 represents the cylinder of the engine, 11 the crank case, 12 the crank shaft, 13 the piston and 14 the pitman rod connecting the piston with the crank shaft. Mounted on the cylinder, in suitable brackets 15 is a vertical shaft 16. Extending longitudinally outwardly of the crank case is a shaft 17, the same being driven from the crank shaft by means of a train of gears 18, this shaft 17 and the lower end of the shaft 16 being provided with worm gears 19 whereby the said shaft 16 is rotated. Disposed in the upper end of the cylinder 10 is a disk 20, said disk being formed with a circumferentially extending and depending flange 21, the outer face of which is grooved for the reception of the expansible packing rings 22. In the center of the disk, and extending through the cylinder head 23 is a stub shaft 24 by which the disk is supported for rotation within the cylinder. This stub shaft is hollow and is adapted to receive the spark plug, (not shown). Formed through the disk, at one side of the center is a port 25 which is adapted to intermittently register with the ports 26 and 27 in the cylinder head, for controlling the inflow of fresh gases and the exhaust of burnt gases. In one side of the upper end of the cylinder, and above the uppermost packing ring is formed an opening 28, through which a portion of a pinion 29, on the upper end of the shaft 16 is adapted to project. This pinion engages with the circumferential series of teeth 30 formed on the disk 20, and by means of which the said disk is rotated as the engine operates.

It will, of course, be understood that when there are a number of cylinders, each one is provided with a disk 30 constructed and arranged in the manner hereinbefore described, and driven from the shaft 17 in the same manner.

Between the disk 20 and the cylinder head are arranged the circular series of ball bearings 31 which facilitates the turning of the disk when upward force is exerted thereagainst due to the compression or expansion of gases between said disk and the piston 13.

What is claimed is:

An explosive engine including a cylinder, a rotatable disk mounted on the inner face of the head of the cylinder and formed with a central hollow stub shaft disposed through the head, said stub shaft being arranged to receive the spark plug, said disk having teeth around its periphery and a depending flange therebelow, packing rings mounted in the outer face of the flange, the cylinder having an opening in one side above the packing rings, and a driving gear engaging said teeth through said opening.

In testimony whereof, I affix my signature, in the presence of two witnesses.

HOWARD H. HUGHES.

Witnesses:
 LAWRENCE HUGHES,
 NORA HUGHES.